US008098273B2

(12) United States Patent
Khouri et al.

(10) Patent No.: US 8,098,273 B2
(45) Date of Patent: Jan. 17, 2012

(54) VIDEO CONTACT CENTER FACIAL EXPRESSION ANALYZER MODULE

(75) Inventors: Joseph Khouri, San Jose, CA (US); Mukul Jain, San Jose, CA (US); Labhesh Patel, San Francisco, CA (US); Sanjeev Kumar, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1427 days.

(21) Appl. No.: 11/643,606

(22) Filed: Dec. 20, 2006

(65) Prior Publication Data

US 2008/0151038 A1 Jun. 26, 2008

(51) Int. Cl.
*H04N 7/14* (2006.01)
(52) U.S. Cl. .............. 348/14.1; 379/88.08; 379/93.25; 379/142.01
(58) Field of Classification Search ............... 379/88.13, 379/183, 88.08, 93.25, 142.01, 142.04, 266.01; 348/14.01, 14.1, 14.07, 239, 739; 382/118
See application file for complete search history.

(56) References Cited

U.S. PATENT DOCUMENTS

| 6,480,599 | B1 * | 11/2002 | Ainslie et al. | 379/265.02 |
| 7,697,673 | B2 * | 4/2010 | Chiu et al. | 379/114.13 |
| 2004/0210159 | A1 * | 10/2004 | Kibar | 600/558 |

OTHER PUBLICATIONS

W.K. Teo, et al., "Facial Expression Detection and Recognition System", 13 pages, Journal of the Institution of Engineers, Singapore, vol. 44 Issue 3 2004.
Marian Stewart Bartlett, et al., "Real Time Face Detection and Facial Expression Recognition: Development and Applications to Human Computer Interaction", Machine Perception Laboratory, Institute for Neural Computation, University of California, San Diego, CA 92093, & Intelligent Robotics and Communication Laboratories, ATR, Kyoto, Japan, 6 pages, Aug. 25, 2011.

* cited by examiner

*Primary Examiner* — Melur Ramakrishnaiah
*Assistant Examiner* — Yosef K Laekemariam
(74) *Attorney, Agent, or Firm* — Fish & Richardson P.C.

(57) ABSTRACT

In one embodiment, a method determines an indication of a mood for a caller during a service call. The mood may be determined using a facial analysis of the caller's facial expressions. The mood may indicate an emotion of the user, such as the user is angry, happy, etc. The mood may be determined based on a facial expression analysis of the caller during a portion of the service call. The service call may be a call between the caller and a service center, which may provide customer support to a caller for a product, service, etc. One example of a service center may be video contact service center that enables video calls with a caller. An action is then determined based on analysis of the mood invoked during a portion of the call. Once the action is determined, the action may be performed.

19 Claims, 3 Drawing Sheets

US 8,098,273 B2

VIDEO CONTACT CENTER FACIAL EXPRESSION ANALYZER MODULE

TECHNICAL FIELD

Particular embodiments generally relate to video analysis in service calls.

BACKGROUND

Video contact centers are being used more often as users start using video telephones. When a user using a video-enabled device (e.g., a 3G telephone) calls into a video service center, video self-service clips may be served back to the user's device. These may be pre-made clips that are served based on different situations, such as in response to general questions. Also, an agent may be involved in the interaction in which case a video communications session between the agent and the caller is used. In this case, the caller and the agent may be able to watch each other during the call. The agent may watch the user and alter the conversation based on a video of the other person. The agent, however, is using personal judgment in altering the conversation and may not always make the best choices.

DESCRIPTION OF EXAMPLE EMBODIMENTS

Overview

Particular embodiments generally relate to performing actions based on a mood of a caller.

In one embodiment, a method determines an indication of a mood for a caller during a service call. The mood may be determined using a facial analysis of the caller's facial expressions. The mood may indicate an emotion of the user, such as the user is angry, happy, etc. The mood may be determined based on a facial expression analysis of the caller during a portion of the service call. The service call may be a call between the caller and a service center, which may provide customer support to a caller for a product, service, etc. One example of a service center may be video contact service center that enables video calls with a caller.

An action is then determined based on analysis of the mood invoked during a portion of the call. For example, the action may include taking a real time action based on the analysis, such as alerting a supervisor if a user is in a bad mood. Further, the action may include suggesting in-call actions, such as telling an agent that the caller is in a bad mood and the agent should not laugh or smile. Also, other actions may include recording the mood and associating it with the portion of the call for historical reporting and analysis. Once the action is determined, the action may be performed.

Example Embodiments

Figure 1:
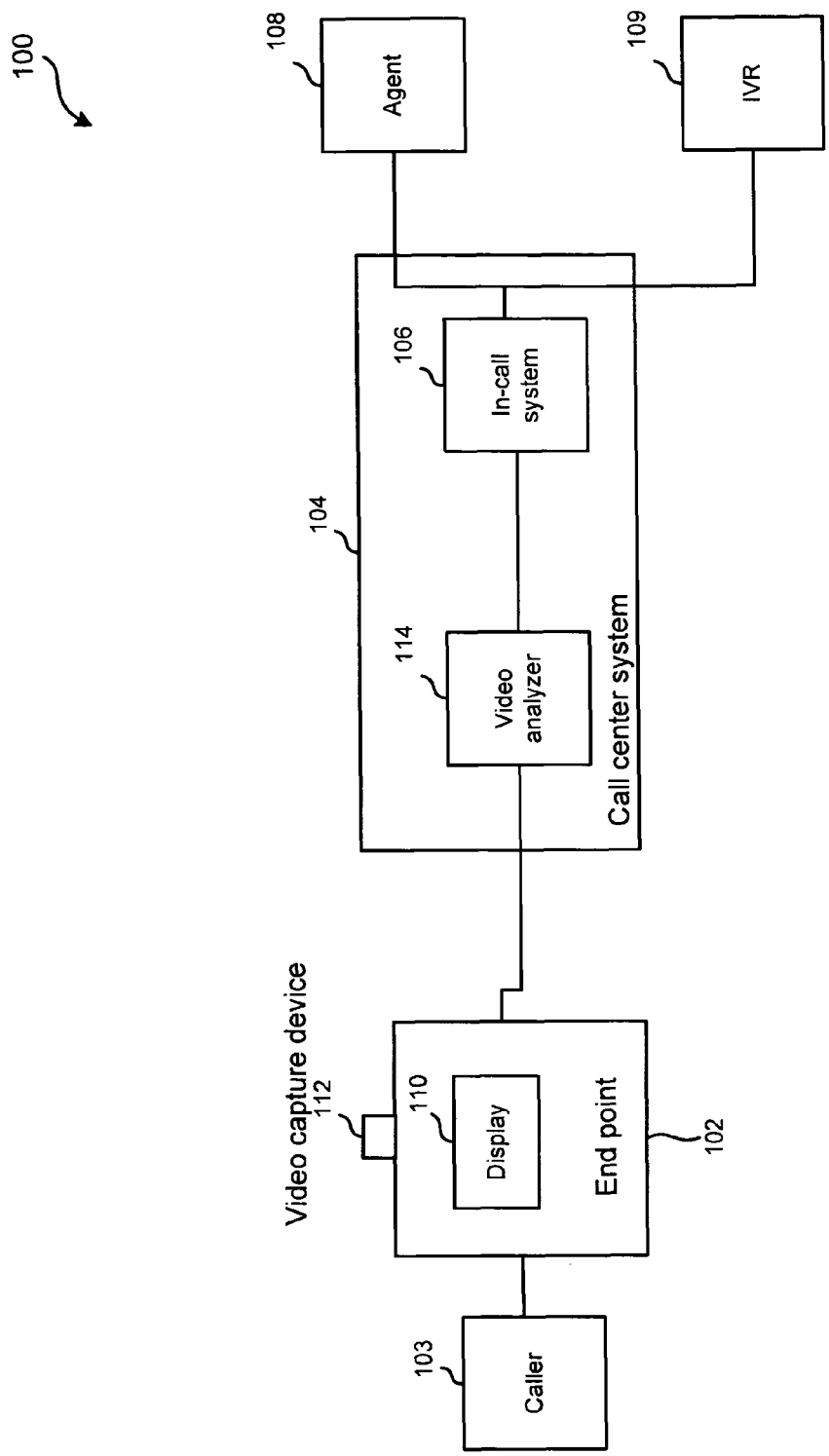
FIG. 1 depicts an example of a system for performing actions based on a caller's mood.

FIG. 1 depicts an example of a system. As shown, an end point 102, a caller 103, a call center system 104, an agent 108, and an interactive voice response system 109 are provided. Other components may also be appreciated in the system.

End point 102 may be any video-enabled end point. For example, end point 102 may include a video-enabled cellular phone, an Internet protocol (IP) telephone, a personal computer, an instant messaging client, a personal digital assistant (PDA), etc.

End point 102 includes a display 110 and a video capture device 112. Video capture device 112 is configured to capture video of a caller using end point 102. For example, video capture device 112 may include a video camera. Display 110 is configured to display information for a call. For example, display 110 may display video of agent 108. Also, display 110 may display video clips sent from call center system 104. It will be recognized that end point 102 does not need to both send and receive video. Rather, the video may be only sent/received in a single direction, such as video is sent from end point 102 to call center system 104.

Caller 103 may participate in service calls with a service center. For example, the service call may include any call to a call center or service center, which may be any entity providing self service or customer support for a product, service, etc. For example, a company may have a call center to handle calls regarding a computer product. During the call, caller 103 may interact with an agent 108 or an interactive voice response (IVR) system 109.

Agent 108 may be a human who is assigned to a service call. The agent may interact with and answer questions from caller 103. In one embodiment, video of agent 108 may be streamed to end point 102. However, in other embodiments, video does not have to be streamed to end point 102. Rather, the video may be streamed in one direction from end point 102 to call center system 104. In this case, agent 108 may see caller 103 but caller 103 may not be able to see agent 108. Further, the video does not have to be sent to agent 108 but may be analyzed by video analyzer 114 for a mood. The video may not be forwarded to agent 108 in some cases.

Interactive voice response system (IVR) 109 may be configured to interact with caller 103 automatically. Prompts may be given to caller 103 and responses provided based on answers from caller 103. In this case, a live agent is not present on the call. In one embodiment, responses may be predetermined video clips and/or voice messages and other answering services may be used instead of IVR 109 or agent 108.

Video capture device 112 is configured to capture video of a caller 103. End point 102 may then send the captured video to call center system 104. Call center system 104 includes a video analyzer 114 configured to determine a mood of caller 103 based on the video information. For example, video analyzer 114 may analyze the facial expressions of caller 103 to determine a mood of a caller. The mood may indicate an emotion or feeling of a caller at a particular time, such as a caller may be happy, sad, serious, angry, etc. The mood may be invoked based on some event, such as an event that occurs during the service call.

In one embodiment, the facial expressions of caller 103 may be analyzed by extracting features of a user's face. Different features may be extracted, such as the regions around the eyes, mouth, etc. These features are analyzed and a mood is determined. For example, while caller 103 is participating in a video call with call center system 104, the facial analysis of caller 103 is continuously performed (or it may be performed at certain intervals). The facial features are extracted and analyzed to determined different moods at different points in the call.

As the video information from video capture device 112 is received, different moods may be determined. For example, different moods are determined based on the analysis of facial expressions of caller 103. Also, it will be understood that other methods of determining a caller's mood may be used. These methods may be used in conjunction with the facial analysis or in lieu of. For example, end point 102 may send information on the user's mood to call center system 104. In one example, a user may select a button that indicates his/her mood is happy, sad, angry, positive, negative, etc. Also, other features of the call may be analyzed, such as the tone of voice, to determine the mood. Further, it should be noted that video analyzer 114 may also be included in end point 102 or any other device that can determine the mood of caller 103. Further, any components of the system may be found in other devices than that described.

In-call system 106 is configured to determine an action to perform based on the mood of caller 103 during a service call. For example, an action to perform is determined based on an analysis of the mood invoked during a portion of the call. Actions may include different actions performed for the service call. For example, a real time action is performed during the call based on the mood in the portion of the call. In one example, if it is detected that a mood of caller 103 is angry, a supervisor for agent 108 may be notified. Also, information on guiding agent 108 and/or an interactive voice response system 109 may be determined and provided during the call. For example, if it is detected that caller 103 is in a bad mood, information indicating that agent 108 should not make jokes may be provided. Further, the mood may be stored with the portion of the service call for historical reporting and analysis.

Accordingly, particular embodiments determine a mood of caller 103 and can determine actions to take during a service call based on the mood. The mood may be determined based on a facial expression analysis of the video. The actions are then performed. This provides a better experience for caller 103 during the service call because personalized actions may be performed based on the mood. Also, by providing guidance to agent 108, standardized guidance may be provided to all agents 108. This may reduce subjective judgment by agents that may not be an accepted way (i.e., the way a company wants) to respond or act on a service call. This may normalize calls and may consistently provide a better experience for a caller.

Figure 2:
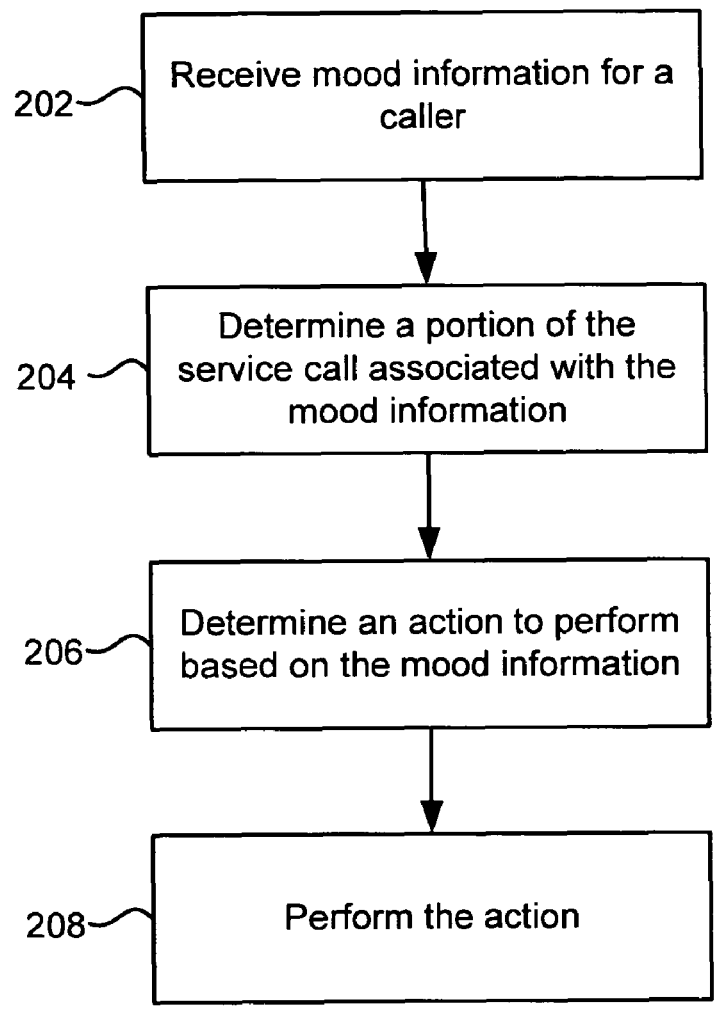
FIG. 2 shows an example of a method for performing actions based on a caller's mood.

FIG. 2 shows an example of a method for performing actions based on a caller's mood. Step 202 receives mood information for caller 103. The mood information may be determined based on a facial expression analysis of video of caller 103 during a service call.

Step 204 determines a portion of the service call associated with the mood information. For example, the portion of the service call that invoked the mood is determined. This may be a time period in the service call in which video is received. Also, the portion may be before or after the facial expression that was used to determine the mood. For example, a question may invoke a mood that is later seen on the video. A time for the portion of the video may be noted, such as a time range, a specific time when the facial expression analysis was performed, etc.

Step 206 then determines an action to perform based on the mood information. For example, one or more of the actions described above may be determined.

Step 208 then performs the action. The action may be performed in real time during the call or may be performed after the call has ended or at another time. As discussed above, different actions may be taken. In one embodiment, in-call system 106 collects the mood of caller 103 and associates it with a portion of a video. A mood may be associated as a property of the portion of the video during the service call. This may be performed for many portions of the video as different moods are invoked. For example, as moods change, a different mood may be associated with video of the service call. Further, at certain intervals, different moods may be determined and associated with the video. The video with the mood as an associated property may then be stored. At a later time, the video may be analyzed to determine the effect of actions taken by agent 108 or IVR system 109. For example, the aspects of interactions may be analyzed to determine which aspects were viewed positively and which were not. Different historical reporting and analysis may be performed using the video with the associated moods invoked. For example, the recorded video with the moods may be used as training for new agents 108. Further, the customer service protocols (e.g., the standard answers to questions that callers may ask) may be changed in that agents 108 may be guided to say different things because of the mood that is invoked by previous protocols. For example, if agents 108 are instructed to continue pushing different products after a caller says no to a product, and it is detected that a bad mood is invoked after the second product offer, agents 108 may be instructed to not provide an offer after a first "no" from a caller.

In another example, in-call system 106 may take real time actions based on the mood information received. For example, if in-call system 106 detects that caller 103 is getting angry, certain actions may be taken. Different rules may be programmed to take different actions. In one case, if caller 103 is getting angry, then a supervisor may be alerted by in-call system 106, such as a message may be sent to a supervisor. In this case, the supervisor may personally get involved to rectify the situation. Also, the action may be determined based on analyzing a portion of the video that invoked the mood. For example, in the portion of the video analyzed, it is determined that a call has been going on for a long time or that an argument has been started, then in-call system 106 may determine that the mood invoked should cause an alert to be sent to the supervisor. However, if the call has just started and a mood determined is angry, in-call system 106 may just decide to wait a little to see if the mood invoked has actually been invoked because of the service call, and not because of other reasons. This provides intelligent analysis of the mood received and eliminates taking unnecessary actions. Other rules may also be tailored to the type of service calls that are being provided by a service center. For example, a serious mood may be interpreted differently for different products/services.

In another embodiment, in-call system 106 may analyze the mood of caller 103 and determine actions that either agent 108 and/or IVR system 109 should take during the call. For example, in-call system 106 may guide agent 108 in how to react or respond to requests/queries from caller 103. For example, if caller 103 is in a serious mood, certain ways of acting may be more appropriate for agent 108. A message may be sent to agent 108 indicating that caller 103 may be in a serious mood and thus a more serious mood may be advised. In this case, video of agent 108 may be analyzed to determine the agent's mood. Also, the tone of voice or other information may be analyzed to determine the mood of agent 108.

Although agent 108 has been described, IVR system 109 may also be used in other embodiments. For example, the options in menu system of IVR system 109 may change based on the caller's mood. If caller 103 is in an angry mood, then, instead of making caller 103 go through many menu items to reach a customer service representative, caller 103 may be presented with the option to go directly to a customer service representative.

In another embodiment, the portions of video with the associated mood may also be used to provide additional information to caller 103. For example, if caller 103 seemed interested in a segment of the video talking about a product X, then follow-up information may be sent to user. Further, personal preferences may be saved and used at a later time. For example, when a caller 103 using the product or logs into another communication channel, such as when a user logs into a web page for the company, etc., actions may be performed based on the mood analysis during the call. For example, information on product X may be displayed on a web page. Further, real time actions may also be taken during the call. For example, if caller 103 seems interested in product X, then in-call system 106 may offer the caller the option to transfer to a specialist to talk about the product. Also, the specialist may be alerted to the interest of caller 103.

Figure 3:
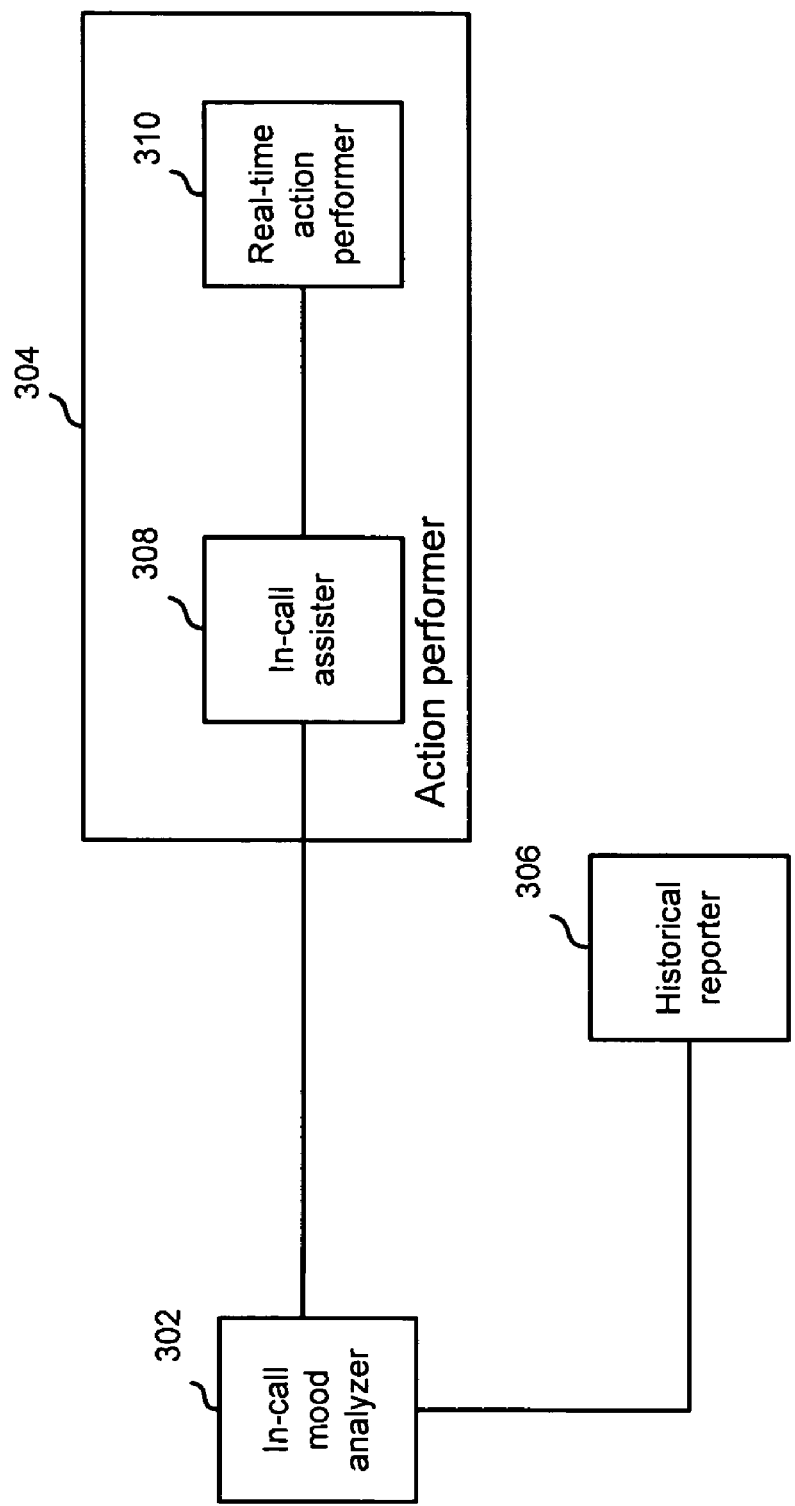
FIG. 3 depicts an example of an in-call system.

FIG. 3 depicts a more detailed example of in-call system 106. As shown, an in-call mood analyzer 302, an action performer 304, and a historical reporter 306 are provided.

In-call analyzer 302 is configured to receive and analyze a mood with a portion of video. In-call analyzer 302 then determines an action to perform.

Action performer 304 can then perform the action. For example, in-call assister 308 may assist agent 108 and/or IVR system 109 during the call. In one example, a guidance on how to act or how to react in the call may be sent to agent 108.

Real time action performer 310 may also perform real time actions during the call. For example, as discussed above, a supervisor may be alerted. Other actions may also be appreciated.

Historical reporter 306 is configured to associate the mood information with portions of video that invoke the mood. The mood may be associated as a property and used later for analysis and historical reporting, such as for training, customer service, etc.

Particular embodiments provide many advantages. For example, a useful way to record and report on a caller's mood during a video service call is provided. Mood information may be gathered from the call and used at a later time for training or customer relationship. This may improve customer service on later calls. Using the historical reporting, coaching may be provided to train customer service agents to better provide customer service. Further, agent ratings may also be provided based on this information such that better agents may be rewarded for their service.

Real time actions may be determined based on the mood to increase customer service during the call. Also, a mood may be associated with portions of the call and used for historical reporting and later analysis.

Particular embodiments may improve the caller experience by increasing awareness for agent 108 and thus the chance for a positive reaction by a caller. This may result in better customer service. The information determined and given to an agent may be normalized for all agents. Thus, personal judgment used during calls that may differ between agents may be minimized. Agents may rely on the accepted advice generated by in-call system 106 instead of their subjective analysis of a caller's facial expression (or tone of voice, attitude, etc.). This provides standardized responses based on the analysis and reduces possible bad judgment that may be found when agents 108 misinterpret the mood of caller 103.

Although the description has been described with respect to particular embodiments thereof, these particular embodiments are merely illustrative, and not restrictive. Although service calls are described, it will be understood that any calls may use teachings of particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   determining, using a call center system, a service call between a caller and a service call center, wherein an end point is associated with the caller in the service call;
   capturing, using a video capture device included in the end point, information for video of the caller, wherein the information for the video is captured during the service call;
   sending, from the end point, the information for the video of the caller to the call center system;
   responsive to receiving the information for the video of the caller from the end point, analyzing, using the call center system, a facial expression of the caller for at least one portion of the service call based on the information for the video of the caller;
   determining, using the call center system, an indication of a mood of the caller for the at least one portion of the service call based on analyzing the facial expression of the caller by extracting features of the caller's face using the information for the video of the caller; and
   determining, using the call center system, at least one action to perform based on determining the indication of the mood of the caller for the at least one portion of the service call; and performing the at least one action in real-time during the service call; wherein performing the action in real-time comprises sending a message to a user not participating in the service call with information about the mood of the caller.

2. The method of claim 1, further comprising:
   associating the at least one portion of the service call with the indication of the mood of the caller; and
   storing the at least one portion of the service call with the indication of the mood determined for the at least one portion.

3. The method of claim 2, further comprising:
   associating a plurality of portions of the service call with a plurality of indications of moods; and
   analyzing the plurality of portions and the indication of the mood associated with each of the plurality of portions to determine which aspects of the plurality of portions of the service call invoked a positive mood or a negative mood.

4. The method of claim 1, wherein determining the at least one action comprises determining information for guiding an agent or interactive voice response system in the service call, the method further comprising:
   sending the information to the agent or interactive voice response system.

5. The method of claim 4, wherein the information comprises information on how to act during the service call.

6. The method of claim 1, wherein the service call is an interactive voice response call, wherein the at least one action affects a menu item provided to the caller by an interactive voice response system associated with the service call.

7. The method of claim 1, wherein the at least one action comprises providing information to the caller based on determining the indication of the mood.

8. The method of claim 7, wherein the information comprises an advertisement or additional information for a product or service in which a positive mood was invoked.

9. The method of claim 1, wherein determining the indication of the mood of the caller further comprises determining the indication of the mood of the caller based on receiving information for the caller selecting at least one of a button and a selector that indicates the mood of the caller.

10. An apparatus comprising:
    one or more processors; and
    logic encoded in one or more tangible media for execution by the one or more processors and when executed are operable to cause the one or more processors to perform operations to:
    determine, using a call center system, a service call between a caller and a service call center, wherein an end point is associated with the caller in the service call;

capture, using a video capture device included in the end point, information for video of the caller, wherein the information for the video is captured during the service call;

send, from the end point, the information for the video of the caller to the call center system;

responsive to receiving the information for the video of the caller from the end point, analyze, using the call center system, a facial expression of the caller for at least one portion of the service call based on the information for the video of the caller;

determine, using the call center system, an indication of a mood of the caller for the at least one portion of the service call based on analyzing the facial expression of the caller by extracting features of the caller's face using the information for the video of the caller; and determine, using the call center system, at least one action to perform based on determining the indication of the mood of the caller for the at least one portion of the service call perform the at least one action in real-time during the service call; and send a message to a user not participating in the service call with information about the mood of the caller.

11. The apparatus of claim 10, wherein the logic when executed is further operable to:

associate the at least one portion of the service call with the indication of the mood of the caller; and store the at least one portion of the service call with the indication of the mood determined for the at least one portion.

12. The apparatus of claim 11, wherein the logic when executed is further operable to:

associate a plurality of portions of the service call with a plurality of indications of moods; and analyze the plurality of portions and the indication of the mood associated with each of the plurality of portions to determine which aspects of the plurality of portions of the service call invoked a positive mood or a negative mood.

13. The apparatus of claim 10, wherein the logic when executed is further operable to:

determine information for guiding an agent or interactive voice response system in the service call; and send the information to the agent or interactive voice response system.

14. The apparatus of claim 13, wherein the information comprises information on how to act during the service call.

15. The apparatus of claim 10, wherein the service call is an interactive voice response call, wherein the at least one action affects a menu item provided to the caller by an interactive voice response system associated with the service call.

16. The apparatus of claim 10, wherein the at least one action comprises providing information to the caller based on determining the indication of the mood.

17. The apparatus of claim 10, wherein the logic when executed is further operable to determine an indication of the mood of the caller based on receiving information for the caller selecting at least one of a button and a selector that indicates the mood of the caller.

18. An apparatus comprising:

a first device configured to determine, with a call center system, a service call between a caller and a service call center, wherein an end point is associated with the caller in the service call; and instructions encoded in a non-transitory machine-readable medium for execution by a processor, the instructions when executed by the processor cause the processor to perform operations including:

capturing, using a video capture device included in the end point, information for video of the caller, wherein the information for the video is captured during the service call;

sending, from the end point, the information for the video of the caller to the call center system;

responsive to receiving the information for the video of the caller from the end point, analyzing, using the call center system, a facial expression of the caller for at least one portion of the service call based on the information for the video of the caller;

determining, using the call center system, an indication of a mood of the caller for the at least one portion of the service call based on analyzing the facial expression of the caller by extracting features of the caller's face using the information for the video of the caller; and determining, using the call center system, at least one action to perform based on determining the indication of the mood of the caller for the at least one portion of the service call performing the at least one action in real-time during the service call; and sending a message to a user not participating in the service call with information about the mood of the caller.

19. A method comprising:

determining, using a call center system, a service call between a caller and a service call center, wherein an end point is associated with the caller in the service call;

receiving information in the call center system from a video capture device that is included in the end point, the received information comprising information associated with video of the caller, wherein the information for the video is captured during the service call;

responsive to receiving the information for the video of the caller from the end point, analyzing, using the call center system, a facial expression of the caller for at least one portion of the service call based on the information for the video of the caller;

determining, using the call center system, an indication of a mood of the caller for the at least one portion of the service call based on analyzing the facial expression of the caller by extracting features of the caller's face using the information for the video of the caller; and determining, using the call center system, at least one action to perform based on determining the indication of the mood of the caller for the at least one portion of the service call performing the at least one action in real-time during the service call; and sending a message to a user not participating in the service call with information about the mood of the caller.

\* \* \* \* \*